United States Patent [19]

Shores

[11] Patent Number: 4,540,293

[45] Date of Patent: Sep. 10, 1985

[54] DIELECTRIC HEAT SENSOR

[75] Inventor: Marvin W. Shores, Pomona, Calif.

[73] Assignee: General Dynamics Pomona Division, Pomona, Calif.

[21] Appl. No.: 533,082

[22] Filed: Sep. 19, 1983

[51] Int. Cl.³ .............................................. G01J 5/00
[52] U.S. Cl. .................................... 374/130; 374/131
[58] Field of Search .................. 374/130, 131; 356/44; 102/202.5, 200, 201, 202.1, 202.2, 202.3, 202.7, 202, 204

[56] References Cited

U.S. PATENT DOCUMENTS

| | | | |
|---|---|---|---|
| 2,916,994 | 12/1959 | O'Neill | 102/202.2 |
| 3,211,096 | 10/1965 | Forney et al. | 102/202.5 |
| 3,315,603 | 4/1967 | Amey et al. | 102/202.7 |
| 3,344,744 | 10/1967 | Bankston | 102/202.1 |
| 3,983,624 | 10/1976 | Gross | 102/202.5 |

FOREIGN PATENT DOCUMENTS

| | | | |
|---|---|---|---|
| 5149814 | 11/1980 | Japan | 374/131 |
| 56-46435 | 4/1981 | Japan | 374/131 |

*Primary Examiner*—Charles Frankfort
*Assistant Examiner*—David R. Schuster
*Attorney, Agent, or Firm*—Neil F. Martin; Calif K. Tervo; Edward B. Johnson

[57] ABSTRACT

A dielectric heat sensor system for monitoring and measuring the effects of electromagnetic radiation on the performance or physical integrity of an electrical or electronic component includes a dielectric receiver in the form of a rectilinear array of fiber optic ends positioned to receive infrared heat waves from a bridgewire of an electro-explosive device and transmitting the infrared heat waves by way of a waveguide of electro optic fibers to an infrared detecting unit which is effective to activate an indicator.

2 Claims, 4 Drawing Figures

DIELECTRIC HEAT SENSOR

BACKGROUND OF THE INVENTION

The present invention relates to the monitoring of instruments and pertains particularly to a dielectric infrared detection and indicating system.

Many electrical and electronic systems contain components that are highly temperature sensitive. Many of these components are affected by electromagnetic radiation which may generate sufficient heat to cause a catastrophic burn out that destroys the performance of the electronic systems. It is desirable to monitor such components to determine the effects of electromagnetic radiation and to detect dangerous temperature rises.

One critical system which requires close monitoring is that of electro-explosive devices which utilize a highly sensitive fuze or bridge wire for activating the explosives.

It is desirable that any instrumentation that is utilized for monitoring such components not distort the effects of any electromagnetic radiation. The presently used techniques for such monitoring, however, typically utilize electrical or electro optical transducers having a conductive element which does affect and distort the effect of any electromagnetic radiation. The typical approach to measuring electromagnetic radiation induced current in a bridgewire is the use of a thermocouple type sensor which is placed as close as possible to the bridgewire without making contact. The current in the bridgewire generates heat due to its resistive losses which heat radiates into the thermocouple which generates a proportional voltage. The voltage is conducted from the electro-explosive device by way of two wires to the electro optical transducer located as close as possible to the thermocouple to minimize wire length. The presence of these conductive components will obviously distort the physical environment in the proximity of the electro-explosive device and, to some degree, influence the real effect of the electromagnetic radiation.

It is desirable that totally dielectric devices be available for sensing and transmitting the temperature level or the electrical current flow associated with a critical component without disturbing its physical or electrical environment and thereby minimize the effect on performance characteristics.

SUMMARY AND OBJECTS OF THE INVENTION

It is the primary object of the present invention to provide a totally non-conductive sensing device capable of sensing temperature level and/or electrical current flow without disturbing or affecting the physical environment.

In accordance with the primary aspect of the present invention, a temperture sensing element comprises an array of optical fiber tips arranged along closely adjacent to or in contact with the surface of an element to be monitored with optical fibers transmitting infrared radiation from the device being monitored to a remote sensing and indicating unit.

BRIEF DESCRIPTION OF THE DRAWINGS

The above and other objects and advantages of the invention will become apparent from the following description when read in conjunction with the drawings wherein.

DETAILED DESCRIPTION OF A PREFERRED EMBODIMENT

Figure 1:
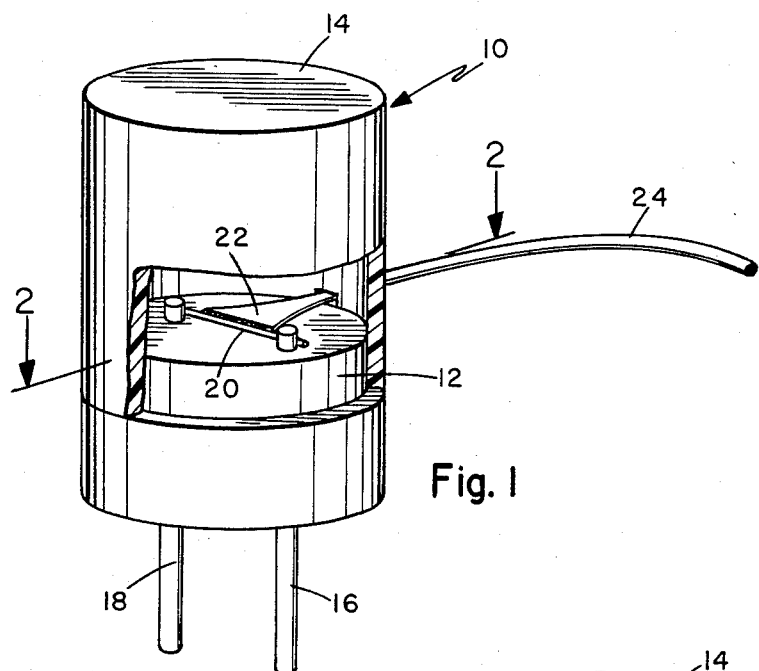
FIG. 1 is a perspective view, partially cut away, of a typical component incorporating the dielectric heat sensor in accordance with the present invention.

Referring to FIG. 1 of the drawing there is illustrated an electro-explosive device less its explosive mix in which there is incorporated an embodiment of the present invention for monitoring the effects of electromagnetic radiation, for example, on a bridgewire. The electro-explosive device, designated generally by the numeral 10, includes an electrical fuze element 12 on which is mounted or attached an explosive cap 14. The cap is typically a light gauge copper cup which holds or is packed with the explosive mix. The fuze device comprises a body having a pair of electrical conductors 16 and 18 mounted in the body member 12 or header which is formed preferably of a suitable insulating material or includes insulation for the conductor elements which extend through and are supported in the body and are connected together by means of a bridgewire 20 which extends between the conductive elements 16 and 18.

The bridgewire 20 fuses or burns when an activating voltage is applied across the conductors 16 and 18 thereby activating the explosive cap 14. Such explosive devices are used, for example, to activate larger explosive devices such as bombs and missile warheads, rocket motors and the like. In order to insure the safety aspect of the bomb or warhead, it is necessary to monitor the fuze that is the bridge wire to insure that electromagnetic radiation does not generate sufficient heat therein to inadvertently activate the explosive device.

The monitoring device in accordance with the present invention comprises a sensing unit 22 which in the illustrated embodiment comprises a rectilinear array of optical fiber ends arranged in a fan configuration. The fibers form a bundle serving as a transmission wave guide for transmitting infrared waves picked up as a result of generation of the heat in the bridgewire 20 to an infrared detector 26. The detector 22 detects and monitors the levels of infrared radiation received and transmits a signal to an indicator 28 which generates or displays an indicator signal. The sensor has the capability of being packed in with the explosive mix to retain a more realistic thermal characteristic.

Figure 2:
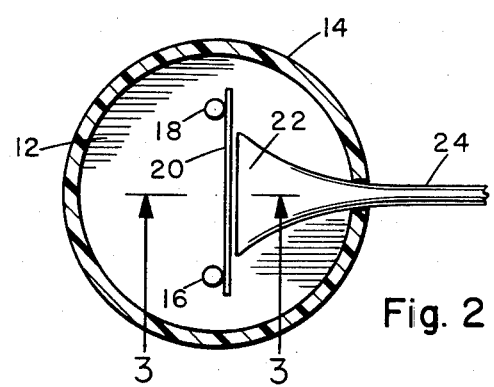
FIG. 2 is a sectional view taken on line 2—2 of FIG. 1.
Figure 3:
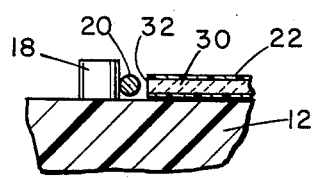
FIG. 3 is an enlarged sectional view taken on line 3—3 of FIG. 2.
Figure 4:
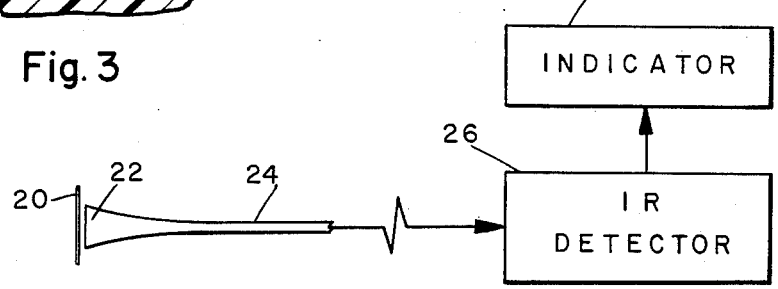
FIG. 4 illustrates schematically the connection of the detector to a sensing and indicating device.

As can be seen in FIGS. 1 and 2, the end 22 of the fiber optic cable is shaped in a fan configuration with the ends of the optical fibers placed in side by side position along the length of the bridgewire 20. The cable is made up of individual optical fibers 30 as shown in FIG. 3, having an end surface 32 shaped and positioned adjacent the bridgewire 20 to serve as a receiving means for infrared energy generated in the bridgewire. The individual fibers are sized and properly sheathed to receive and form a wave guide for transmission of the infrared rays along the optical cable 24 to the infrared detector 26. The fiber optic receiver and transmitter cable, being a true dielectric non-conductor, senses infrared rays put out by the bridgewire 20 yet has little or no affect on the environment of the bridgewire. The distribution of the optical conductor along the length of the wire insures that each portion of the wire along the entire length will be monitored by the monitoring system.

The device is totally dielectric and is capable of sensing and transmitting the temperature level, or indirectly, the electrical current flow associated with a critical component of the bridgewire 20 in the system without disturbing its physical or electrical environment. This, therefore, has a miminal affect, if any, on its performance characteristics. The device is capable of instrumentation in many situations requiring a remote monitor or indicator. The device is particularly adaptable for the measuring the effects of electromagnetic radiation in particularly sensitive environments thereby providing undisturbed data.

The illustrated embodiment shows a particular application of the device and illustrates its safety aspects in the monitoring of electro-explosive components contained within missiles and other electrically fuzed ammunition or explosive devices.

The center end of the optical waveguide is a uniquely shaped to capture the total distribution pattern of infrared energy emitted across the full length of the component being measured such as, for example, the bridgewire of the electro-explosive devices illustrated. It has been found that a bridgewire typically fuses at a specific point along its length and not uniformly end to end. The present invention is uniquely adapted to sense an arbitrary number of increments across the critical component thus capturing the point of heat concentration. This is in contrast to the thermocouple technique which averages the total to be emitted. Heat concentration is thought to be the result of normal dimensional and metal density variations across the length of the bridgewire.

The physical dimensions of the sensor device requires relatively small space making it more adaptable for use in densely packed systems. The present invention will sense energy beyond the infrared spectrum although it is particularly adaptable to the infrared spectrum. Its practical limits are defined by the bandwidth of the optical wave guide and the remote detection device used. Spectrum selectivity is preferably performed by optical filters within the system.

Since the device is a non-conductor of electrical and a poor conductor of heat, it is technically feasible that the sensor end of the device could be installed in intimate contact with the bridgewire as an active electro-explosive device. Such a configuration would allow heat sensing with virtually no alteration to the electro-explosive device performance and its thermal characteristics.

In operation, should a fuze device in accordance with that illustrated be placed in an atmosphere subject to electromagnetic radiation, a certain amount of current would be generated in the bridgewire 20. This current generates heat which results in a generation of infrared energy being transmitted or radiated from the bridgewire. The fiber optic sensing device receives the infrared radiation and transmits it along the type optical wave guides to the infrared detector which may by filter means select certain band widths and generate a signal in direct proportion to the concentration thereof for activating some form of indicator 28.

Infrared is an electromagnetic radiation with frequency ranging from approximately 1 million to 500 million MHz and falls between that of visible light and the microwave region used for high definition radars. Infrared exhibits some of the properties of visible light and in other of its characteristics, it more closely resembles radio or radar waves. For example, parabolic mirrors and lenses are used to collect and focus infra- red energy as with visible light. Yet infrared radiation can be transmitted through materials like silicon and germanium which are opaque to visible light.

Infrared radiation is generated by molecular thermal action within the object. Every object having a temperature above absolute zero ($-273$ C.) whose molecular thermal action ceases, radiates infrared energy.

Infrared energies radiated by any object covers a wide range of frequencies or wave lengths. The wave length of maximum or peak radiation occurs or is determined by the object's temperature. For example, peak radiation from an object at 500 degrees Fahrenheit occurs at a wave length of five and one-half microns. A micron is equal to one ten-thousandths of a centimeter and is normally used to express wave lengths in the infrared region.

The fibers are clad to give them their wave guide characteristics. They are sized to function for the particular wave guide environment.

By way of example, the infrared energy captured is a function of the diameter of the bridgewire. Taking for example a bridge wire having a diameter of $3.8 \times 10^{-3}$ CM, a length of $1.3 \times 10^{1}-$CM, a surface area of $1.5 \times 5 \times 10^{-3}$ CM$^2$ with a resistance of 1.0 ohms. Nominal current of $1.0 \times 10^{-3}$ amphere. Heat (i.r. energy generated) would amount to $(1.0 \times 10^{-3})^2 \times 1.0 = 1 \times 10^{-6}$ watts. Higher density $6.45 \times 10^{-4}$ watts per CM$^2$.

Fiber optic field view would be approximately 10 percent of bridgewire surface.

Losses (thermal conduction and fiber optic line) assumed to 50 percent.

Energy capture at the detector equals about $3.23 \times 10^{-5}$ to the watts per CM$^2$.

While I have illustrated and described my invention by means of specific embodiments, it is to be understood that numerous changes and modifications may be apparent within the scope of the invention as defined by the appended claims.

I claim:

1. A dielectric heat sensor for monitoring the temperature of a bridgewire of an explosive device at substantially each point along said bridgewire's entire length without interfering with the electromagnetic environment, said bridgewire responding by temperature change to electromagnetic radiation; said sensor comprising:
    a plurality of dielectric optical waveguide means for position adjacent said bridgewire along substantially the entire length of said bridgewire for receiving infrared waves from substantially each point along the entire length of said bridgewire, and for transmitting received infrared waves to a remote location;
    remotely positioned infrared detector means connected to said dielectric optical waveguide means for detecting infrared waves transmitted thereto; and
    indicator means responsive to the detection of infrared waves by said detector for generating a signal.

2. The heat sensor of claim 1 wherein:
    said optical waveguide means is a plurality of optical fibers formed into a waveguide.

* * * * *